(12) United States Patent
Finlay, Sr. et al.

(10) Patent No.: US 7,212,386 B1
(45) Date of Patent: *May 1, 2007

(54) GFCI WITH MISWIRE LOCKOUT

(75) Inventors: David A. Finlay, Sr., Marietta, NY (US); Thomas N. Packard, Syracuse, NY (US); Richard Weeks, Little York, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 240 days.

This patent is subject to a terminal disclaimer.

(21) Appl. No.: 11/103,722

(22) Filed: Apr. 12, 2005

Related U.S. Application Data (63) Continuation-in-part of application No. 10/884,304, filed on Jul. 2, 2004, now Pat. No. 7,133,266, and a continuation-in-part of application No. 10/942,633, filed on Sep. 16, 2004, now Pat. No. 7,173,799, said application No. 10/884,304 is a continuation of application No. 09/971,525, filed on Oct. 5, 2001, now Pat. No. 6,856,498, which is a continuation-in-part of application No. 09/718,003, filed on Nov. 21, 2000, now Pat. No. 6,522,510.

(51) Int. Cl.
*H02H 2/28* (2006.01)

(52) U.S. Cl. ..................... 361/42

(58) Field of Classification Search ............ 361/42, 361/45, 46
See application file for complete search history.

(56) References Cited

U.S. PATENT DOCUMENTS

| | | | |
|---|---|---|---|
| 4,412,193 A | 10/1983 | Bienwald et al. | |
| 5,202,662 A | 4/1993 | Bienwald et al. | |
| 5,477,412 A | 12/1995 | Neiger et al. | |
| 5,600,524 A | 2/1997 | Neiger et al. | |
| 5,706,155 A | 1/1998 | Neiger et al. | |
| 5,729,417 A | 3/1998 | Neiger et al. | |
| 6,040,967 A | 3/2000 | DiSalvo | |
| 6,052,265 A | 4/2000 | Zaretsky et al. | |
| 6,226,161 B1 | 5/2001 | Neiger et al. | |
| 6,246,558 B1 | 6/2001 | DiSalvo et al. | |
| 6,288,882 B1 | 9/2001 | DiSalvo et al. | |

(Continued)

*Primary Examiner*—Stephen W. Jackson
*Assistant Examiner*—Boris Benenson
(74) *Attorney, Agent, or Firm*—Daniel P. Malley; Bond, Schoeneck + King PLLC (57) ABSTRACT

The present invention is directed to an electrical wiring protection device that includes a housing assembly having at least one line terminal and at least one load terminal partially disposed therein. A first conductive path is electrically coupled to the at least one line terminal. A second conductive path is electrically coupled to the at least one load terminal, the second conductive path being connected to the first conductive path in a reset state. A fault detection circuit is coupled to the first conductive path. The fault detection circuit is configured to generate a fault detection signal in response to detecting at least one fault condition. A wiring state detection circuit is coupled to the first conductive path. The wiring state detection circuit selectively provides a wiring state detection signal when the at least one line terminal is coupled to a source of AC power, and not providing the wiring state detection signal otherwise. An actuator assembly is configured to provide an actuation stimulus in response to the fault detection signal or the wiring state detection signal. A circuit interrupter is coupled to the actuator assembly. The circuit interrupter is configured to disconnect the first conductive path and the second conductive path in response to the actuation stimulus.

39 Claims, 7 Drawing Sheets

U.S. PATENT DOCUMENTS

| | | |
|---|---|---|
| 6,381,112 B1 | 4/2002 | DiSalvo |
| 6,437,953 B2 | 8/2002 | DiSalvo et al. |
| 6,442,007 B1 | 8/2002 | Li |
| 6,522,510 B1 | 2/2003 | Finlay et al. |
| 6,587,319 B1 | 7/2003 | Finlay, Sr. |
| 6,590,753 B1 | 7/2003 | Finlay |
| 6,611,406 B2 | 8/2003 | Neiger et al. |
| 6,628,486 B1 | 9/2003 | Macbeth |
| 6,646,838 B2 | 11/2003 | Ziegler et al. |
| 6,657,834 B2 | 12/2003 | DiSalvo |
| 6,671,145 B2 | 12/2003 | Germain et al. |
| 6,693,779 B2 | 2/2004 | DiSalvo |
| 6,697,238 B2 | 2/2004 | Bonilla et al. |
| 6,717,782 B2 | 4/2004 | DiSalvo et al. |
| 6,734,769 B1 | 5/2004 | Germain et al. |
| 6,771,152 B2 | 8/2004 | Germain et al. |
| 6,788,173 B2 | 9/2004 | Germain et al. |
| 6,807,035 B1 | 10/2004 | Baldwin et al. |
| 6,813,126 B2 | 11/2004 | DiSalvo et al. |
| 6,828,886 B2 | 12/2004 | Germain et al. |
| 6,856,498 B1 | 2/2005 | Finlay, Sr. |
| 6,867,954 B2 | 3/2005 | Wu et al. |
| 6,920,025 B2 | 7/2005 | Nelson |
| 6,946,935 B2 * | 9/2005 | Wu et al. .................. 335/18 |
| 6,958,895 B1 * | 10/2005 | Radosavljevic et al. ...... 361/42 |
| 7,009,473 B2 | 3/2006 | Zhang |
| 7,031,126 B2 | 4/2006 | Bonilla et al. |
| 7,133,266 B1 * | 11/2006 | Finlay ........................ 361/42 |
| 2004/0004801 A1 | 1/2004 | Bonilla et al. .............. 361/115 |
| 2006/0018062 A1 * | 1/2006 | Wu et al. ..................... 361/42 |

* cited by examiner

GFCI WITH MISWIRE LOCKOUT

CROSS-REFERENCE TO RELATED APPLICATIONS

This is a continuation-in-part of U.S. patent application Ser. No. 10/884,304 filed on Jul. 2, 2004 now U.S. Pat. No. 7,133,266 and U.S. patent application Ser. No. 10/942,633 filed on Sep. 16, 2004 now U.S. Pat. No. 7,173,799, U.S. patent application Ser. No. 10/884,304 is a continuation of U.S. patent application Ser. No. 09/971,525 filed on Oct. 5, 2001 now U.S. Pat. No. 6,856,498, which is a continuation of U.S. patent Ser. No. 09/718,003 filed Nov. 21, 2000 now U.S. Pat. No. 6,522,510, the contents of which are relied upon and incorporated herein by reference in its entirety, and the benefit of priority under 35 U.S.C. §120 is hereby claimed.

BACKGROUND OF THE INVENTION

1. Field of the Invention

The present invention relates generally to protection devices, and particularly to protection devices having miswire protection.

2. Technical Background

Protective devices such as ground fault circuit interrupters (GFCIs) are well known in the art. Their intent is and always has been to protect the electrical power user from electrocution when hazardous ground fault currents are present.

Historical problems with these protective devices include the possibility of line/load miswiring in the field by an installer or the eventual failure of the solenoid driving device, typically a silicon controlled rectifier, which causes the interrupter device to become inoperable while electrical power is still present, even under hazardous ground fault conditions. A variety of methods are used to prevent or attempt to prevent miswiring with varying levels of success. Preventing the problems associated with a defective solenoid driving device is inherently more difficult. Labels and installation instruction sheets have been used to prevent miswiring, but can be ignored by the installer. Solenoid burn-out has been revealed by testing the protective device with a test button, but the result of the test can be ignored by the user.

Most GFCIs have test and reset buttons having associated instructions molded into the front cover of the device. The instructions typically require the user/homeowner to push the test button monthly. When depressed, the test button generates a current to simulate a fault condition. The device is not providing ground fault protection when the reset button fails to pop out. Accordingly, the user is instructed to replace the device. However, this approach has several drawbacks.

Of course, users routinely ignore the instructions printed on the cover of GFCI devices. If the device fails, the user is not aware that the device is not affording any protection. On the other hand, even if the user does press the button and discover that the device has failed, it may be some time before the user replaces the device.

Another drawback of the standard devices relates to the fact that a line-load miswire condition is often not tested by the test button. When a device is miswired, it may not protect the user from a fault condition even if it is functioning properly. The hazard will be present at the receptacle outlets even if the device is tripped. In other words, when a miswiring condition is present, the AC power is connected directly to the load terminals. The load terminals are typically connected to the user load terminals (i.e., the receptacles). When the device trips, the conductive path between the line terminals and load terminals is interrupted. However, since the load terminals and the user load terminals are still connected, the device fails to protect the user. In this case, the test and reset buttons may operate normally, giving the user a false sense of security.

In one approach that has been considered, a lock-out mechanism has been introduced such that the device will not reset if there is a line-load miswire condition. Power is denied to the load side circuit until the miswire condition is eliminated. Further, if the device is experiencing an internal fault such that the device is not operating properly, the device will likewise, not reset. One drawback to this condition is that it provides the user a disincentive to test. In other words, the user will feel inconvenienced if the device does not work after the test button is pushed. Further, this approach fails to address the scenario described above, when users fail to routinely use the test button.

In another approach that has been considered, a fused miswire circuit is disposed in the GFCI. If the device is miswired, the circuit induces a current simulating a fault condition, and the device trips. If the device is wired properly, the circuit again induces a current simulating a fault condition, and the device again trips. However, the current continues to flow until a fuse burns out. One drawback to this approach is that the miswire detection circuit may only be used once, and is forever disabled thereafter.

What is needed is a multi-shot method for testing miswiring. Further, a device is needed that eliminates any hazard at the receptacle outlets when the device is tripped.

SUMMARY OF THE INVENTION

The present invention address the needs described above. The present invention provides a multi-shot miswire detection circuit. Further, the present invention eliminates hazardous conditions at the receptacle outlets when the device is tripped.

One aspect of the present invention is directed to an electrical wiring protection device that includes a housing assembly having at least one line terminal and at least one load terminal partially disposed therein. A first conductive path is electrically coupled to the at least one line terminal. A second conductive path is electrically coupled to the at least one load terminal, the second conductive path being connected to the first conductive path in a reset state. A fault detection circuit is coupled to the first conductive path. The fault detection circuit is configured to generate a fault detection signal in response to detecting at least one fault condition. A wiring state detection circuit is coupled to the first conductive path. The wiring state detection circuit selectively provides a wiring state detection signal when the at least one line terminal is coupled to a source of AC power, and not providing the wiring state detection signal otherwise. An actuator assembly is configured to provide an actuation stimulus in response to the fault detection signal or the wiring state detection signal. A circuit interrupter is coupled to the actuator assembly. The circuit interrupter is configured to disconnect the first conductive path and the second conductive path in response to the actuation stimulus.

In another aspect, the present invention is directed to an electrical wiring protection device that includes a housing assembly having at least one line terminal and at least one load terminal partially disposed therein. A first conductive path is electrically coupled to the at least one line terminal.

A second conductive path is electrically coupled to the at least one load terminal, the second conductive path being connected to the first conductive path in a reset state. A fault detection circuit is coupled to the first conductive path, the fault detection circuit being configured to generate a fault detection signal in response to detecting at least one fault condition. A reset button is coupled to the at least one line terminal. A wiring state detection circuit is coupled to the reset button, the wiring state detection circuit selectively providing a wiring state detection signal when the reset button is actuated and the at least one line terminal is coupled to a source of AC power, and not providing the wiring state detection signal otherwise. An actuator assembly is configured to provide an actuation stimulus in response to the fault detection signal or the wiring state detection signal. A circuit interrupter is coupled to the actuator assembly, the circuit interrupter being configured to disconnect the first conductive path and the second conductive path in response to the actuation stimulus.

In yet another aspect, the present invention is directed to an electrical wiring protection device that includes a housing assembly including at least one line terminal and at least one load terminal partially disposed therein. A first conductive path is electrically coupled to the at least one line terminal. A second conductive path is electrically coupled to the at least one load terminal, the second conductive path being connected to the first conductive path in a reset state. A fault detection circuit is coupled to the first conductive path, the fault detection circuit being configured to generate a fault detection signal in response to detecting at least one fault condition. A reset mechanism is coupled to the at least one line terminal. A wiring state detection circuit is coupled to the reset mechanism, the wiring state detection circuit selectively providing a wiring state detection signal when the reset mechanism is actuated and the at least one line terminal is coupled to a source of AC power, and not providing the wiring state detection signal otherwise. An actuator assembly is configured to provide an actuation stimulus in response to the fault detection signal or the wiring state detection signal. A circuit interrupter is coupled to the actuator assembly, the circuit interrupter being configured to disconnect the first conductive path and the second conductive path in response to the actuation stimulus. A reset lockout is coupled to the circuit interrupter, the reset lockout preventing the circuit interrupter from connecting the first conductive path and the second conductive path in response to an actuation of the reset mechanism in the absence of the wiring state detection signal.

In yet another aspect, the present invention is directed to a circuit interrupting device that includes a housing. A phase conductive path and a neutral conductive path are each disposed at least partially within the housing between a line side and a load side, the phase conductive path terminating at a first connection capable of being electrically connected to a source of electricity, a second connection capable of conducting electricity to at least one load and a third connection capable of conducting electricity to at least one user accessible load, and the neutral conductive path terminating at a first connection capable of being electrically connected to a source of electricity, a second connection capable of providing a neutral connection to the at least one load and a third connection capable of providing a neutral connection to the at least one user accessible load. A circuit interrupting portion is disposed within the housing and configured to cause electrical discontinuity in the phase and neutral conductive paths between the line side and the load side upon the occurrence of a predetermined condition. A reset portion is disposed at least partially within the housing and configured to reestablish electrical continuity in the phase and neutral conductive paths. The circuit interrupting device further includes a reset lockout portion that prevents reestablishing electrical continuity in the phase and neutral conductive paths if a reverse wiring condition exists. The reset portion includes a reset button and at least one reset contact which, when depressed, is capable of contacting at least a portion of the phase conductive path to cause the circuit interrupting portion to operate if the device is properly wired. If the circuit interrupting portion is operational, the circuit interrupting portion is activated to disable the reset lockout portion and facilitate reestablishing electrical continuity in the phase and neutral conductive paths. If the reverse wiring condition exists, the circuit interrupting portion is non-operational, and the reset lockout portion remains enabled so that reestablishing electrical continuity in the phase and neutral conductive paths is prevented.

In yet another aspect, the present invention is directed to a circuit interrupting device that includes a housing. A first electrical conductive path is disposed at least partially within the housing and terminating at a first connection, the first connection being capable of electrically connecting to a source of electricity. A second electrical conductive path is disposed at least partially within the housing and terminating at a second connection, the second connection being capable of electrically connecting to at least one load when electrical continuity between the first and second electrical conductive paths is made. A third electrical conductive path is disposed at least partially within the housing and terminating at a third connection, the third connection being capable of electrically connecting to at least one user accessible load when electrical continuity between the first and third electrical conductive paths is made. A circuit interrupting portion is disposed within the housing and configured to break electrical continuity between the first and second conductive paths and between the first and third conductive paths upon the occurrence of a predetermined condition. A reset portion is disposed at least partially within the housing and configured to make electrical continuity between the first and second conductive paths and between the first and third conductive paths. The circuit interrupting device further comprises a reset lockout portion that prevents the making of electrical continuity between the first and second conductive paths and between the first and third conductive paths, if the circuit interrupting portion is non-operational. The reset portion includes a reset button and at least one reset contact which when depressed is capable of contacting at least a portion of one of the first or second conductive paths to cause the circuit interrupting portion to operate if the device is properly wired. If the circuit interrupting portion is operational, the circuit interrupting portion is activated to disable the reset lockout portion and facilitate making of electrical continuity between the first and second conductive paths and between the first and third conductive paths. If the device is reverse wired the circuit interrupting portion is non-operational, the reset lockout portion remains enabled so that making of electrical continuity between the first and second conductive paths and between the first and third conductive paths is prevented.

In yet another aspect, the present invention is directed to a circuit interrupting device that includes a housing. At least one input conductor is disposed at least partially within the housing and capable of being electrically connected to a source of electricity. At least one output conductor is disposed within the housing and capable of conducting electrical current to a load when electrically connected to the at least one input conductor. A circuit interrupter is disposed within the housing and configured to break the electrical connection between the input and output conductors in response to the occurrence of a predetermined condition. A reset lock-out is operable between a lock-out position wherein the reset lock-out inhibits resetting of the electrical connection between the input and output conductors, and a reset position wherein the reset lock-out does not inhibit resetting of the electrical connection between the input and output conductors. A reset mechanism is operatively associated with the reset lock-out and the circuit interrupter such that activation of the reset mechanism activates the circuit interrupter if the device is properly wired to facilitate movement of the reset lock-out from the lock-out position to the reset position by the reset mechanism, the reset mechanism does not activate the circuit interrupter if the device is reverse wired such that the reset lock-out remains in the lock-out position.

In yet another aspect, the present invention is directed to ground fault circuit interrupting device that includes a housing. At least one input conductor is disposed at least partially within the housing and capable of being electrically connected to a source of electricity. At least one output conductor is disposed within the housing an capable of conducting electrical current to a load when electrically connected to the at least one input conductor. A circuit interrupter is disposed within the housing and configured to break the electrical connection between the input and output conductors in response to the occurrence of a ground fault or test cycle. A reset mechanism includes a reset lock-out responsive to activation of the circuit interrupter so as to be movable between a lock-out position wherein the reset lock-out inhibits resetting of the electrical connection between the input and output conductors and a reset position wherein the reset lock-out does not inhibit resetting of the electrical connection between the input and output conductors. An actuation of the reset mechanism in a proper wiring condition activates the circuit interrupter to facilitate movement of the reset lock-out from the lock-out position to the reset position by the reset mechanism and resets the electrical connection between the input and output conductors. An actuation of the reset mechanism in a reverse wiring condition does not activate the circuit interrupter to facilitate movement of the reset lock-out from the lock-out position to the reset position.

In yet another aspect, the present invention is directed to a method for interrupting and resetting electrical connections in fault interrupting devices having a housing. An input conductor is disposed at least partially within the housing and electrically connected to a source of electricity, and an output conductor is disposed at least partially within the housing and capable of conducting electrical current to a load when electrical continuity between the input and output conductors is made The method includes the steps of sensing the occurrence of a predefined condition; breaking electrical continuity between the input and output conductors when the predefined condition is sensed using a circuit interrupting mechanism; enabling a lock-out mechanism to inhibit the making of electrical continuity between the input and output conductors after breaking electrical continuity between the conductors; and activating a reset mechanism to activate the circuit interrupting mechanism to disable the lock-out mechanism and make electrical continuity between the input and output conductors if the input connector is coupled to AC power, and wherein the circuit interrupting mechanism is not activated if the input connector is not coupled to AC power.

In yet another aspect, the present invention is directed to a circuit interrupting device that includes a line side connection capable of being electrically connected to a source of electricity. A load side connection is capable of being electrically connected to a load side conductor for providing electricity to a load side. A user load connection is capable of conducting electricity to at least one load for providing an electrical connection to the source of electricity. A first conductive path provides an electrical connection between the line side connection and the user load connection. A second conductive path provides an electrical connection between the line side connection and the load side connection. A reset mechanism is also included. A fault detection circuit is configured to detect a fault condition. A wiring state detector is included, separate from the fault detection circuit, the wiring state detector being configured to test for a proper wiring condition when the reset mechanism is actuated. A circuit interrupter is configured to interrupt the at least one of the first conductive path or the second conductive path when a proper wiring condition or a fault condition is detected.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the ground fault circuit interrupter (GFCI) of the present invention is shown in FIG. 1, and is designated generally throughout by reference numeral 10.

Figure 1:
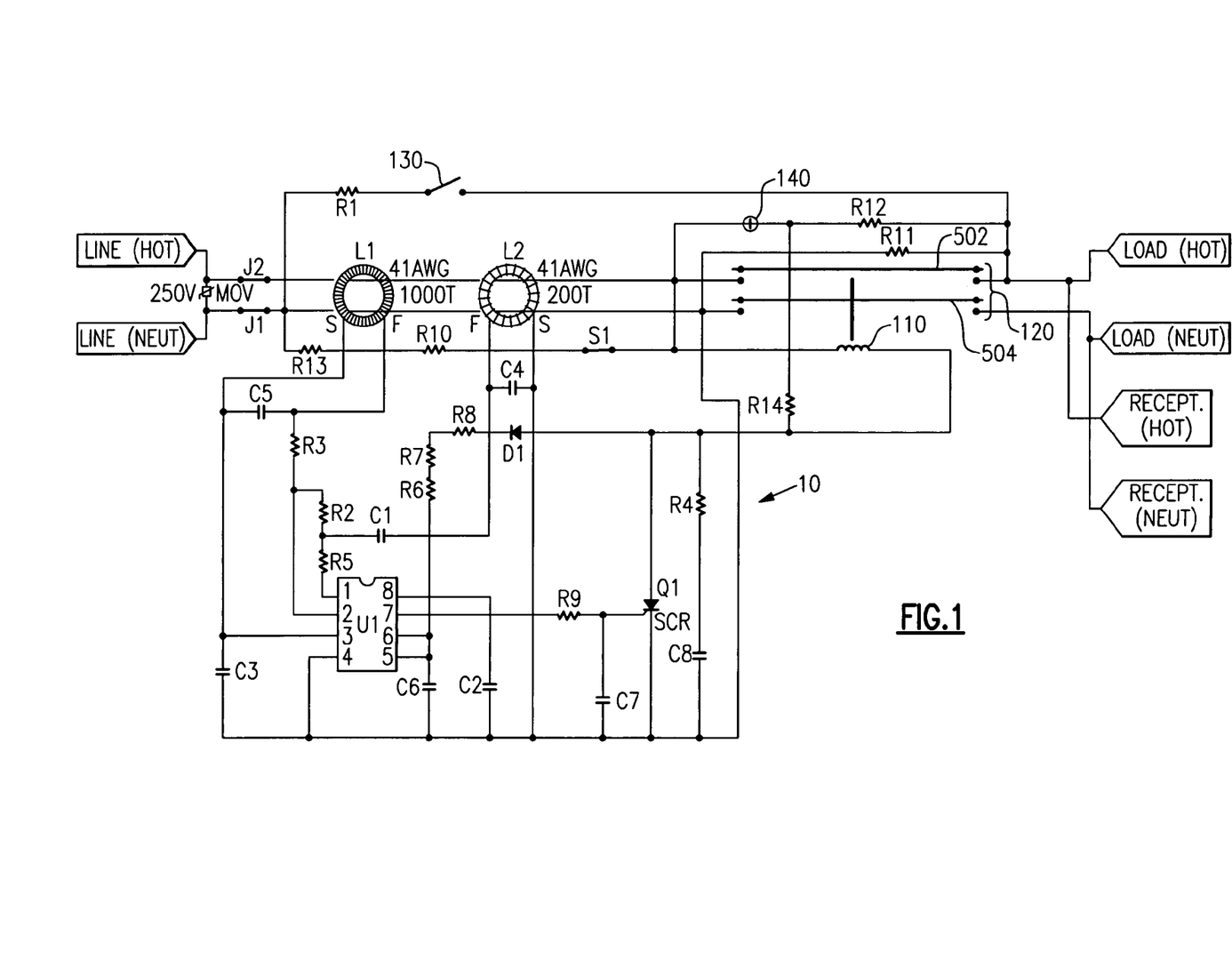
FIG. 1 is a schematic of a GFCI circuit with miswire protection and an indicator lamp according to one embodiment of the present invention.

As embodied herein and depicted FIG. 1, a GFCI circuit in accordance with one embodiment is shown. When a differential transformer L1 senses unequal amounts of current flowing in the hot and neutral conductors due to a ground fault condition, device 10 causes a breaker coil 110 to activate, opening circuit interrupting mechanism 120. As shown, circuit interrupting mechanism 120 includes hot and neutral bus bars 502, 504. The circuit interrupting mechanism 120 is configured to establish and break connectivity between the hot and neutral AC power lines, and the hot and neutral load lines, respectively. Bus bar 502 and bus bar 504 includes interrupting contacts designed to mate with corresponding contacts located on both AC power lines and the load lines.

Device 10 includes a test circuit. The test circuit includes test button 130. Test button 130 is configured to induce a simulated ground fault when pushed. If the fault detection circuitry is operating properly, breaker coil 110 activates circuit interrupter 120.

GFCI 10 also includes a miswire circuit which uses a fault resistance R10, R13 to create a differential current on the primary of the differential current transformer L1. The differential current exceeds the level of differential current that the GFCI has been designed to interrupt, typically 6 milliamperes. The fault resistance R10, R13 is on the line side of interrupting contacts 120. Note that the ground fault circuit sensing electronics, including IC U1, derive power from the line side terminals of the GFCI.

In this embodiment, if GFCI 10 is miswired such that AC power is connected to the load terminals, nothing visible happens if the GFCI is tripped. On the other hand, if the GFCI is in the reset condition, it will immediately trip when powered. Thus, when device 10 is miswired, the current flowing through the fault resistance R10, R13, will be interrupted when the device trips. Resistors R10, R13 will remain intact because the estimated time it takes for the fault resistors R10, R13 to "clear," or burn out, is greater than 50 ms, and typically in the 300 ms range. On the other hand, the trip time of the GFCI is less than or equal to 25 ms. Thus, fault resistors R10, R13 do not have enough time to clear. If the device is reset in the miswired condition, the device trips out immediately thereafter. This cycle will continue until the device is wired correctly, i.e., when power is connected to the GFCI line terminals.

Thus, a properly wired device 10 operates as follows. When electrical power is connected in a correct manner to the line terminals, a differential current is created by the fault resistance R10, R13 when power is applied to the device. If the device is reset before power is applied, the device trips as a result of this differential current. If the device is already in the tripped condition before power is applied, nothing visible happens. However, because the fault resistor is on the line side of the interrupting contacts 120, current through fault resistance R10, R13 continues to flow, regardless of interrupting contacts 120 being open. This internal differential current, created by the fault resistance R10, R13 clears itself in a short time, typically 300 ms. The clearance time is a function of the resistors' power rating. Thus, a resistor(s) is selected having a power rating that is greatly exceeded by the current. Another option is to provide a fuse F1 that is placed in series with the fault resistances R10, R13. The fuse is selected such that its $I^2t$ rating is less than the resistors. Accordingly, the fuse opens instead of the fault resistors R10, R13. The term "resistive element" as used herein may refer to either a resistance or a fuse. Once the device has been properly wired and the fault has been cleared, the device can be reset and provide its normal protective functions.

Device 10 also includes indicator circuit. The indicator circuit includes a light 140 that is configured to have multiple indication meanings. The indicator circuit includes resistors R11, R12, R14, and indication device 140. In one embodiment, light 140 is implemented using a neon light. Those skilled in the art will recognize that light 140 may be implemented using LEDs or other such means. The first function of light 140 is as a trip indicator. The light is off if the GFCI is in the reset condition, and illuminates if the GFCI trips. The second function of light 140 is to indicate miswiring. A third function of light 140 is to notify the user that the solenoid-driving device is defective and that the GFCI is no longer operational.

The indicating circuit operates as follows. When the GFCI is wired properly, i.e., power from the supply source is connected to the line terminals and not the load terminals, and the device is reset, light 140 is off, as the line disconnecting contacts 120 are closed, resulting in no voltage across light 140 and resistor R12. If the GFCI trips for any reason, light 140 energizes as a result of line voltage being applied across light 140 and resistors R12 and R11. When the device is reset, voltage is removed and light 140 turns off. If the device is miswired for any reason, light 140 is off when the GFCI is reset, but when the device trips in this condition, there is not return path to neutral through resistor R11, and light 140 does not turn on as it would if the GFCI were wired properly. This feature is not dependent on the fault resistance R10, R13; therefore, if the miswire detection circuit has been previously used and the fault resistance cleared, miswire detection is still possible by exercising this light in conjunction with tripping out the GFCI.

Indicating a defective solenoid driving device, such as SCR Q1, is achieved with the addition of a resistor R14. With resistor R14 in the circuit, light 140 energizes when the SCR Q1 short circuits and a path to supply neutral develops. When this occurs, and the device is reset, the GFCI trips, energizing light 140 through resistor R14. Continuously applied line voltage to the solenoid occurring as a result of a shorted SCR Q1 causes the trip solenoid (coil 110) to open within a few seconds. Coil 110 burns out since it is continuously energized, so it cannot trip again after the device is reset. When the GFCI is reset in this condition, light 140 remains energized, indicating a defective solenoid driving device. The value of resistor R14 must be kept low relative to the value of resistor R12 as a voltage divider occurs between resistors R12 and R14 which limits the voltage across light 140. A neon lamp needs a minimum of about 60 volts to arc over and energize. A value of 33K for resistor R14 is suitable for this embodiment, which provides for about 66 volts across the neon lamp at a worst case line voltage of 102 VAC. Computing different values for resistors R11, R12, and R14 based on different types of lights 140 is considered within the capabilities of one skilled in the art.

Of course, device 10 also includes a reset button which is not shown in FIG. 1 for clarity of illustration. As described in more detail in FIGS. 4–11, a multi shot miswire detection circuit may be implemented as part of the reset mechanism.

Figure 2:
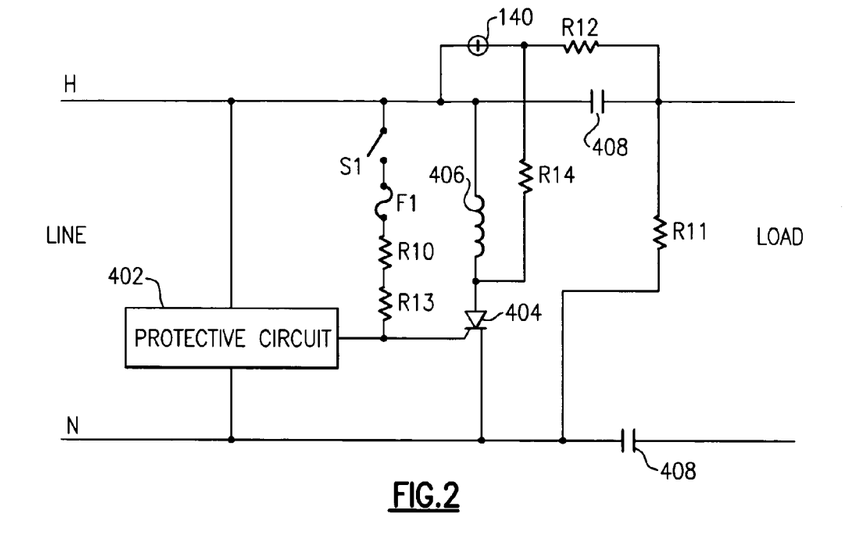
FIG. 2 is a diagrammatic depiction of a protective circuit with miswire protection according to an alternate embodiment of the invention.

As embodied herein and depicted in FIG. 2, a schematic diagram of a miswire protection circuit in accordance with another embodiment of the present invention is disclosed. The embodiment is generalized to apply to different protective devices such as ground fault circuit interrupters (GFCIs) or devices intended to interrupt ground faults from personnel contact with a power line conductor, arc fault circuit interrupters (AFCIs) intended to interrupt line current which if allowed to continue could cause an electrical fire, combination devices that provide both AFCI and GFCI protection, or the like.

Accordingly, the protective device 10 includes a protective circuit 402 that is configured to detect one or more fault conditions (arc fault, ground fault, etc.). In response to detecting a fault, protective circuit 402 drives electronic switching device 404 (SCR) into a conducting state to thereby energize solenoid 406. Solenoid 406 opens interrupting contacts 408 in an energized state. Note that solenoid 406 receives power from the line conductors. Thus, when AC power is applied to the load terminals, no power is applied to either protective circuit 402, SCR 404, solenoid 406, or multi-shot miswire detection circuit 410.

With regard to the miswire circuit, fault resistors R10, R13, switch S1, and fuse F1, have the same functions as previously described in FIG. 1. The indicator circuit, i.e., resistors R11, R12, R14, and light 140 also have the same functions as previously described. When power is miswired to the load terminals and the protective device is reset such that interrupting contacts 408 are closed, current flows through normally closed switch S1, fuse F1, fault resistors R10, R13 and the gate-cathode junction of SCR 404, energizing solenoid 406 and tripping the interrupting contacts 408. Fuse F1 and fault resistors R10, R13 are chosen to withstand the current flow for the time that power is applied to the load terminals to the moment when interrupting contacts 408 open, approximately 25 milliseconds. If line power is connected as intended to the line terminals of the protective device, current flows through normally closed switch S1, fuse F1, fault resistors R10, R13, and the gate cathode junction of SCR 404 until such time as fuse F1 clears, after which it is possible to accomplish a resetting of the interrupting contacts 408. Solenoid 406 is designed not to burn out during the interval that SCR 404 is conductive, which interval is designed to be approximately 100 milliseconds. In this manner the protective functions described in FIG. 1 are provided without necessarily requiring a differential current transformer L1 in the construction of the protective device nor attachment of the fault resistor and fuse circuit to both the hot and neutral line conductors. If an electronic switching device other than an SCR is used, e.g., a bipolar transistor, the connections shown here are being made to the gate of the SCR would instead be made to the base of the bipolar transistor. "Gate" and "base" are intended to have an equivalent meaning in this specification and claims.

Figure 3:
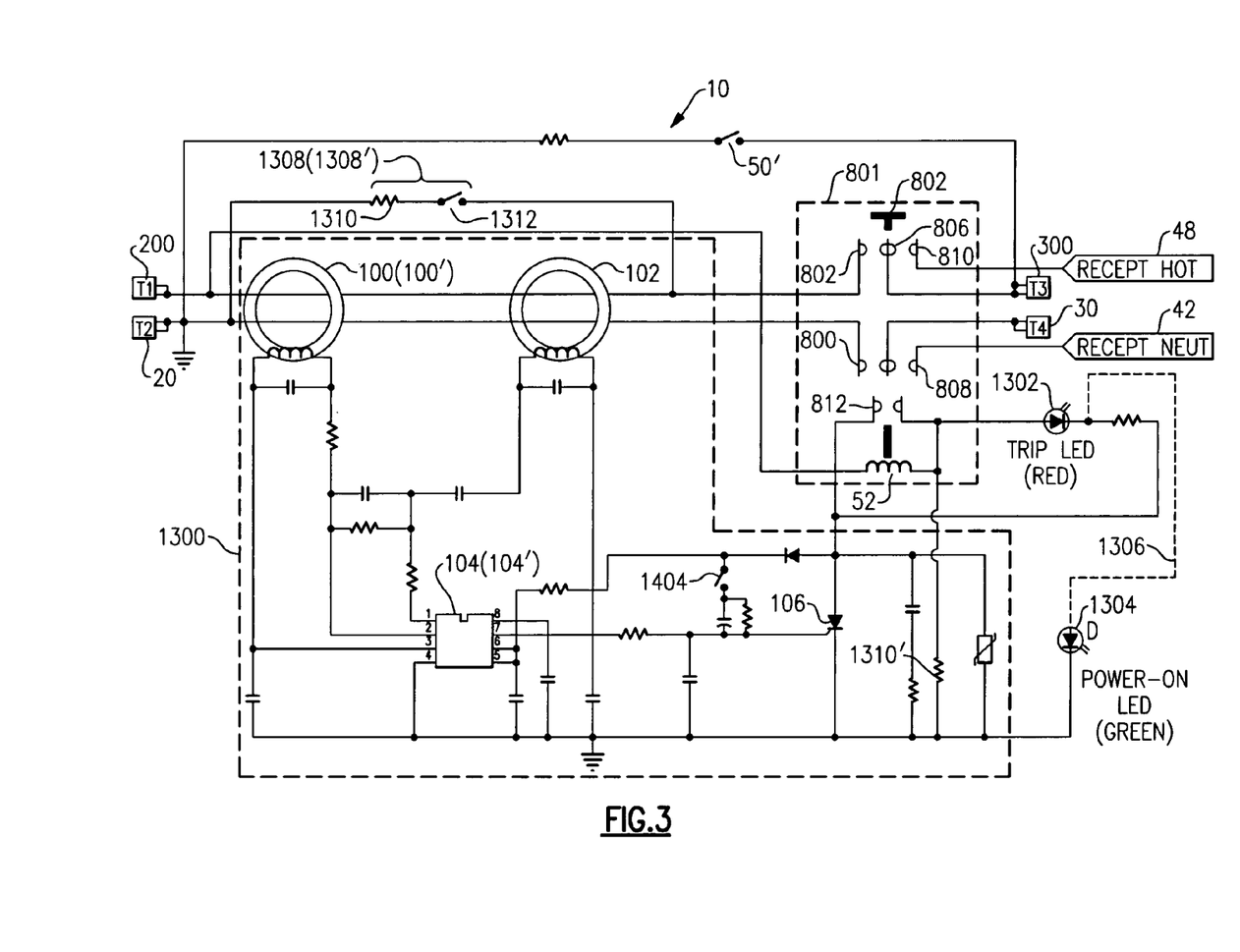
FIG. 3 is a diagrammatic depiction of a protective circuit with miswire protection according to another embodiment of the invention.

As embodied herein and depicted in FIG. 3, a schematic of an electrical wiring device 10 in accordance with another embodiment of the present invention is depicted. Device 10 is configured to sense and detect fault conditions that may occur in the electrical distribution system, as well as simulated fault conditions, that are either manually or automatically generated. Fault conditions may include arc faults, ground faults, or both.

Device 10 includes three main portions: a detection circuit 1300, a miswire detection circuit 1308, and tripping mechanism 801. Detection circuit 1300 includes differential transformer 100. Transformer 100 is configured to sense a difference in the current between the hot and neutral conductors connected respectively to terminals 20 and 200. The difference current is generated by a fault current to ground when a person is contacting ground at the same time as an inadvertently exposed hot conductor connected to terminals 300 or 48 (the current through the person flows through the hot conductor but does not return through the neutral conductor.) The sensed signal is detected by detector 104 which can include any of a variety of integrated detection circuits, such as the RV 4141 manufactured by Fairchild Semiconductor Corporation. The detected signal turns on SCR 106 to actuate solenoid 52 to trip the trip mechanism 801 as has been described.

In one embodiment of the present invention, trip mechanism 801 includes an auxiliary switch 812. Auxiliary switch contacts 812 open when trip mechanism 801 is in the tripped position. If SCR 106 has reached end-of-life and is permanently ON, auxiliary switch 812 assures that solenoid 52 is not permanently connected to a source of current. Otherwise, solenoid 52 may become thermally damaged by continuous exposure to the current, and be unable to operate trip mechanism 801 to interrupt a fault condition. If SCR 106 has reached end of life, and reset button 822 is depressed to close the various contacts associated with trip mechanism 801, auxiliary switch 812 closes. In response thereto, solenoid 52 will immediately trip the mechanism again. Thus, auxiliary contacts 812 ensure that trip mechanism 801 will not remain reset when an end-of-life condition has been reached. Accordingly, load terminals 30 and 300, and receptacle terminals 42 and 48 may not be permanently connected to line terminals 200 and 20 when SCR 106 has reached end of life, sometimes referred to as safe failure of device 10.

Device 10 also includes a trip indicator 1302. Indicator 1302 is coupled to auxiliary switch 812. When trip mechanism 801 is in the tripped state, indicator 1302 is illuminated. Thus, when the indicator is activated, the user realizes that device 10 is the cause of the power interruption in the circuit. Indicator 1302 furthermore demonstrates to the user if auxiliary switch 812 is operational. Those of ordinary skill in the art will recognize that indicator 1302 may be implemented as a lamp, an annunciator, or both. In the ON state, indicator 1302 may transmit continuously or intermittently. Device 10 also may include a "power-on" indicator 1304. Dashed line 1306 between indicator 1304 and DC ground represents the power-on indicator circuit. Indicator 1304 is configured to demonstrate that power is being delivered to the load terminals 30 and 300, and receptacle terminals 42 and 48. Those of ordinary skill in the art will recognize that indicator 1304 may be implemented as a lamp, an annunciator, or both. In one embodiment, miswire detection circuit 1308 includes a miswire resistor 1310 in series with an optional switch 1312. Switch 1312, if provided, is open during manufacturing assembly to facilitate electrical testing of device 10. After device 10 has been tested, switch 1312 is closed during assembly, before device 10 is in the commercial stream. When device 10 is properly wired, i.e., the source of power of the electrical distribution system is connected to line terminals 20 and 200, a constant current flows through resistor 1310. Resistor 1310 is configured to open circuit when the electrical current has flowed for a predetermined time. In one embodiment the predetermined time is about 1 to 5 seconds. After resistor 1310 has open circuited, reset button 822 may be depressed, enabling trip mechanism 801 to enter the reset state. Optionally, a fuse or an air gap device (not shown) can be connected in series with resistor 1310 whereby resistor 1310 remains closed and the fuse or air gap device is responsible for open circuiting within the predetermined time. As described in more detail below, a multi-shot miswire detection circuit may be implemented as part of the mechanism that includes reset button 822. See FIGS. 4–11.

Referring back to FIG. 3, device 10 includes auxiliary switch 1404 in accordance with an alternate embodiment of the present invention. In this embodiment, the auxiliary switch 1404 is disposed between the detector 104 power supply line and the detector output. Of course, the detector output is connected to SCR 106 control input. When switch 1404 is closed, SCR 106 is turned ON.

If device 10 is miswired, the current fails to flow through resistor 1310 in the manner described above and resistor 1310 fails to open-circuit. Instead, the current through resistor 1310 is sensed by differential transformer 100 as a differential current. Detector 104 interprets the differential current as a fault condition. Accordingly, detector 104 signals the control input to SCR 106. SCR 106 is turned ON to thereby actuate solenoid 52. Solenoid 52 generates a magnetic field and mechanism 801 is tripped. Thus, the current flowing through resistor 1310 is interrupted before resistor 1310 open-circuits. The duration of the current flow through resistor 1310 is approximately the response time of device 10. In other words, the current flowing through resistor 1310 is interrupted in less than 0.1 seconds. As such, the duration of the current flow is too brief to cause opening of resistor 1310. If reset button 822 is depressed to reset trip mechanism 801, current starts to flow again through resistor 1310. However, the current is again detected and device 10 is immediately tripped. Accordingly, device 10 will repeatedly trip when the source of power of the power distribution system is miswired to the load terminals.

Accordingly, the present invention is configured such that contact pair 808/804 and contact pair 804/800 are open (tripped) when device 10 is miswired. The tripped state prevents the AC power source, having been miswired to the load terminals (30,300), from permanently providing power to the receptacle terminals even though a fault condition in the user attachable load might be present. Although the miswire circuit has been described with respect to a resistor 1310 that opens when the device has been properly wired, any number of fusible links familiar to those skilled in the art may be employed. The fusible link may open (clear) due to a predetermined fusing characteristic. The fusible link may be configured to open when a nearby resistance heats the fuse link to a predetermined temperature.

Those of ordinary skill in the art will recognize that there are other miswire protection methods configured to permanently block the ability to reset device 10 until device 10 has been properly wired. For example, resistor 1310 may provide a physical block that prevents interference between escapement 830 and latch 826. See FIG. 8. When device 10 is properly wired, resistor 1310 conducts a steady current which causes resistor 1310 to heat sufficiently to melt solder on its solder pads. A spring bias (not shown) may be implemented to urge resistor 1310 to dislodge. Dislodged resistor 1310, no longer providing a physical block, permits reset button 822 to establish the interference between escapement 830 and 826. Accordingly, until the device is wired properly, resistor 1310 will not be dislodged and device 10 cannot be reset.

As will be described in more detail relative to FIGS. 4–11, a multi-shot miswire detection circuit may also include a miswire lockout mechanism that prevents reset unless the device is properly wired.

An AFCI or other protective device may be protected from miswiring by including trip mechanism 801 and a miswiring circuit 1308'. Sensor 100' and detector 104' are configured to sense and detect the particular fault condition(s) being protected. The miswire resistor may be configured to generate a simulated fault signal. As described above, the miswire resistor clears when device 10 is properly wired. As such, the simulated fault condition is likewise cleared, permitting the trip mechanism 801 to reset. Alternatively, the miswire resistor may be configured to generate a trip signal that does not represent a fault condition. The trip signal similarly interrupts when device 10 is properly wired, permitting the trip mechanism 801 to reset. For example, miswire resistor 1310' generates a trip signal to turn SCR 106 ON. Solenoid 52 is activated until device 10 is properly wired, whereupon resistor 1310' is cleared to create an open circuit.

Figure 4:
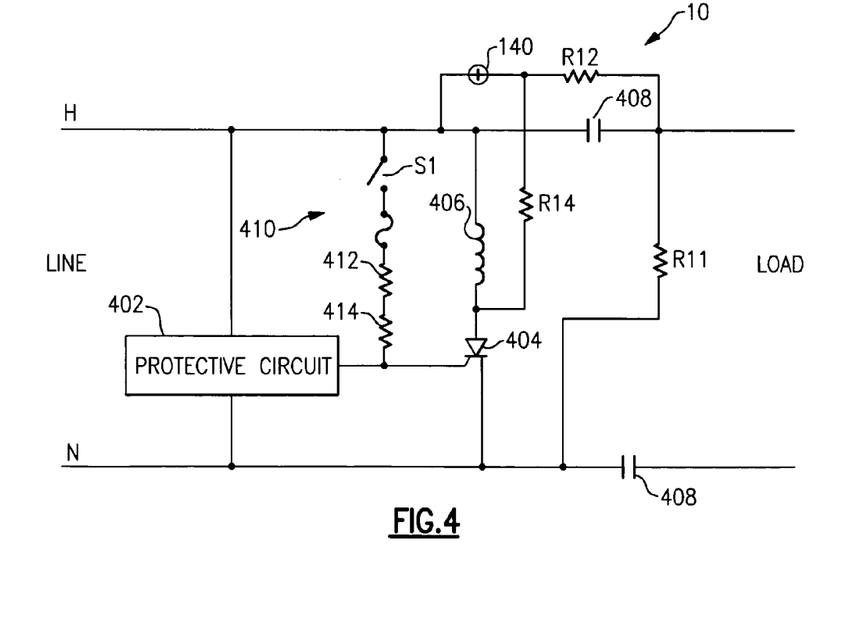
FIG. 4 is a diagrammatic depiction of a protective circuit with miswire protection according to yet another embodiment of the invention.

As embodied herein and depicted in FIG. 4, a miswire protection circuit in accordance with another embodiment of the present invention is disclosed. The circuit may also be referred to as a wiring state detection circuit because the circuit operates when the device is properly wired and does not operate if miswired. This embodiment is very similar to the embodiment depicted in FIG. 2 and is also generalized to apply to different protective devices such as ground fault circuit interrupters (GFCIs) or devices intended to interrupt ground faults from personnel contact with a power line conductor, arc fault circuit interrupters (AFCIs) intended to interrupt line current which if allowed to continue could cause an electrical fire, combination devices that provide both AFCI and GFCI protection, or the like. Therefore, the protective device 10 includes a protective circuit 402 that is configured to detect one or more fault conditions (arc fault, ground fault, etc.).

In this embodiment, the miswire circuit 410 is disposed between the hot line conductor and the input to SCR 404. One difference between this embodiment and the embodiment depicted in FIG. 2 is that switch S1 is coupled to the reset button. When the reset button is depressed, switch S1 is closed. If device 10 is properly wired, current flows through the miswire circuit 410 to activate SCR 404. SCR 404 energizes solenoid 406. The armature in solenoid 406 is configured to drive a miswire lockout mechanism (not shown in FIG. 4) into an unlocked state, permitting the circuit interrupting contacts 408 to close (reset.) However, if AC power is connected to the load terminals, miswire circuit 410 is not connected to a source of power. When the reset button is depressed, solenoid 406 is not energized and the armature fails to dislodge the miswire lockout. Note that the indicator circuit including resistors R11, R12, R14, and light 140 have the same functions as previously described in the previously disclosed embodiments.

Figure 5:
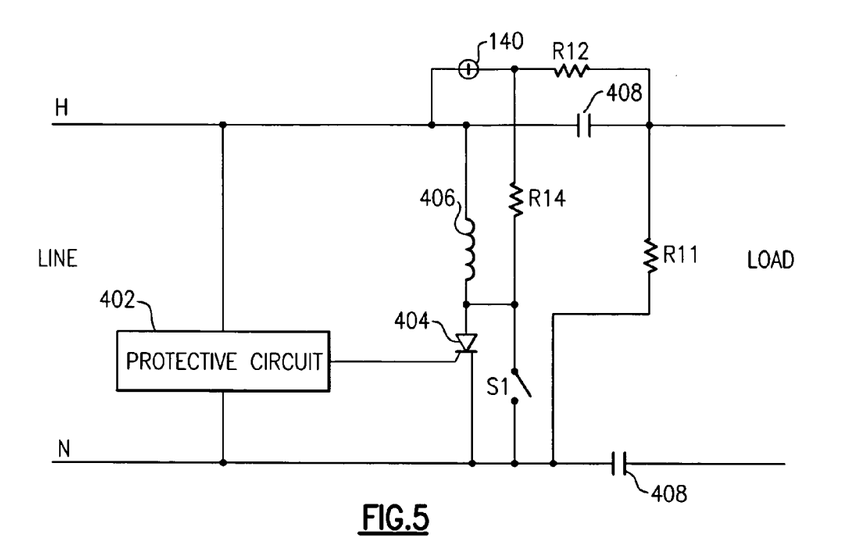
FIG. 5 is a diagrammatic depiction of a protective circuit with miswire protection according to yet another embodiment of the invention.

FIG. 5 is another embodiment of the multi-shot miswire circuit. In this case, switch S1 is connected in parallel with SCR 404. If device 10 is properly wired, current flows through solenoid 406. Again, the armature moves in response thereto. The armature in solenoid 406 is configured to drive miswire lockout mechanism (not shown) into an unlocked state, permitting the circuit interrupting contacts 408 to close (reset.) However, if AC power is connected to the load terminals, switch S1 is not connected to a source of power. When the reset button is depressed, solenoid 406 is not energized and the armature fails to dislodge the miswire lockout.

Figure 6:
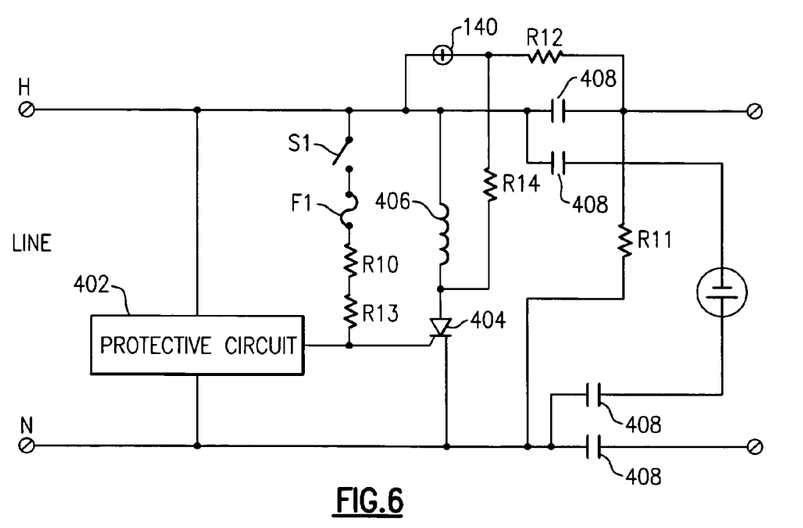
FIG. 6 is a schematic of the electrical wiring devices in accordance with yet another embodiment of the present invention.

FIG. 6 is a four pole version of the embodiment depicted in FIG. 4. Thus, this embodiment is very similar to the embodiment shown in FIG. 2 as well. A four pole device includes four circuit interrupters—two for the hot conductors and two interrupters for the neutral conductors. For example, when the device is tripped, the connection between the hot line conductor and the hot load conductor is interrupted. In addition, the connection between the hot line conductor and the hot user load conductor (i.e., the hot outlet receptacle) is likewise interrupted. The neutral side of the device is identical. When the device is tripped, the connection between the neutral line conductor and the neutral load conductor is interrupted. In addition, the connection between the neutral line conductor and the neutral user load conductor (i.e., the neutral outlet receptacle) is interrupted.

The miswire circuit operates as follows. When the reset button is depressed, switch S1 is closed. If device 10 is properly wired, current flows through the miswire circuit 410 to activate SCR 404. SCR 404 energizes solenoid 406. The armature in solenoid 406 is configured to drive a miswire lockout mechanism (not shown in FIG. 6) into an unlocked state, permitting the circuit interrupting contacts 408 to close (reset.)

However, if AC power is connected to the load terminals, miswire circuit 410 is not connected to a source of power. When the reset button is depressed, solenoid 406 is not energized and the armature fails to dislodge the miswire lockout. Again, the indicator circuit including resistors R11, R12, R14, and light 140 have the same functions as previously described in the previously disclosed embodiments.

Figure 7:
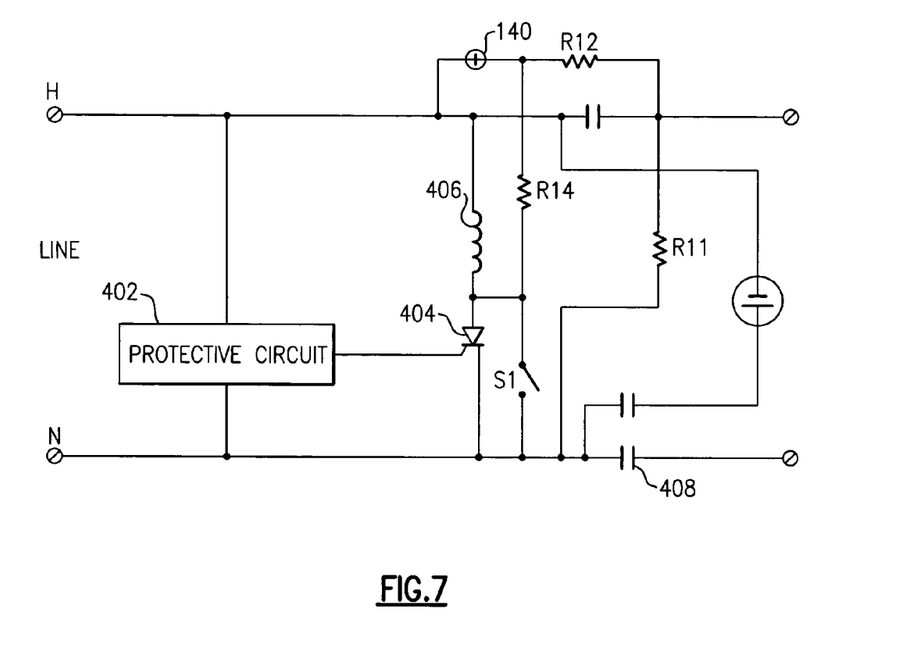
FIG. 7 is a detail view of a reset lock-out mechanism according to one embodiment of the present invention.

Referring to FIG. 7, a three-pole version of the miswire circuit depicted in FIG. 5 is disclosed. In a three pole arrangement, the circuit interrupter 408 includes an additional circuit interrupter disposed between the neutral line conductor and the neutral user load (receptacle outlet). In this embodiment, switch S1 is connected in parallel with SCR 404. If device 10 is properly wired, current flows through solenoid 406 and the armature moves in response. The armature in solenoid 406 is configured to drive a miswire lockout mechanism (not shown) into an unlocked state and the circuit interrupters 408 are tripped. However, if AC power is connected to the load terminals, switch S1 is not connected to a source of power. When the reset button is depressed, solenoid 406 is not energized and the armature fails to dislodge the miswire lockout.

As embodied herein and depicted in FIGS. 8–11, a detail view of a reset lock-out mechanism is disclosed. FIGS. 8–11 assume that the device is properly wired. Initially, when device 10 is in the tripped condition, latch 826 is not coupled to escapement 830.

Figure 8:
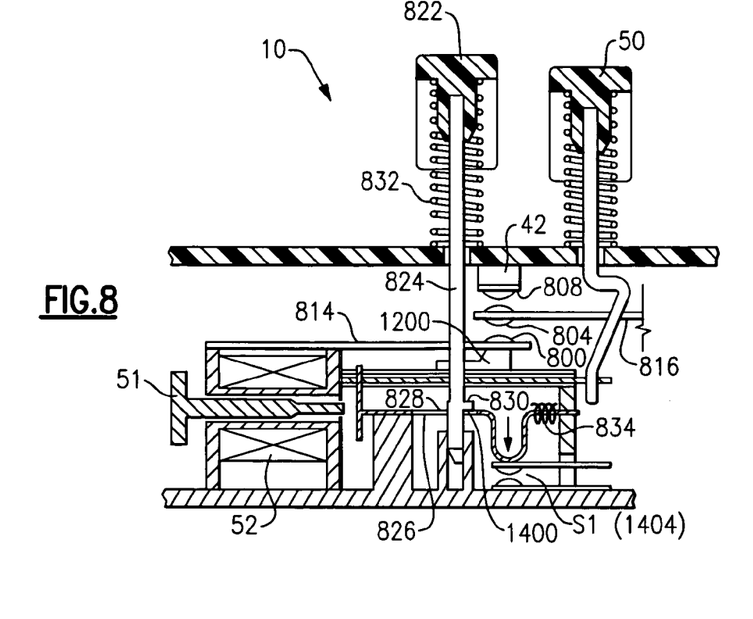
FIG. 8 is another detail view of a reset lock-out mechanism.
Figure 9:
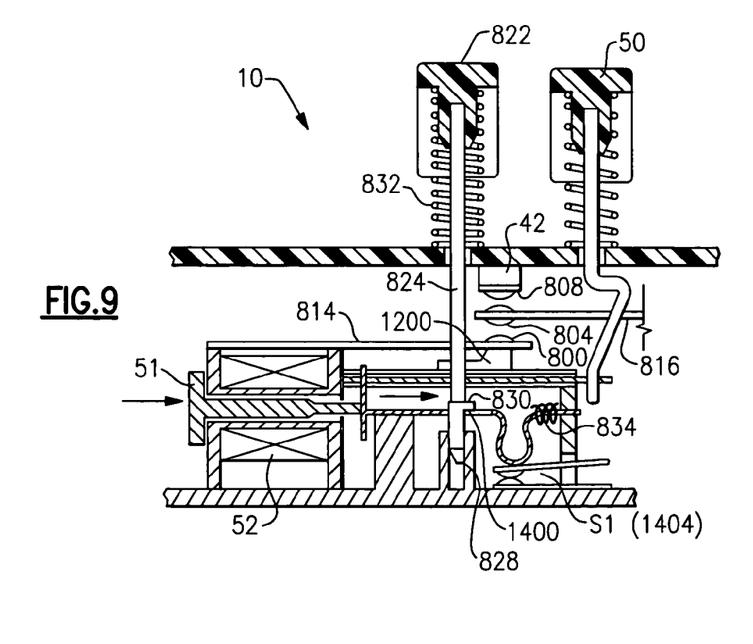
FIG. 9 is yet another detail view of a reset lock-out mechanism.
Figure 10:
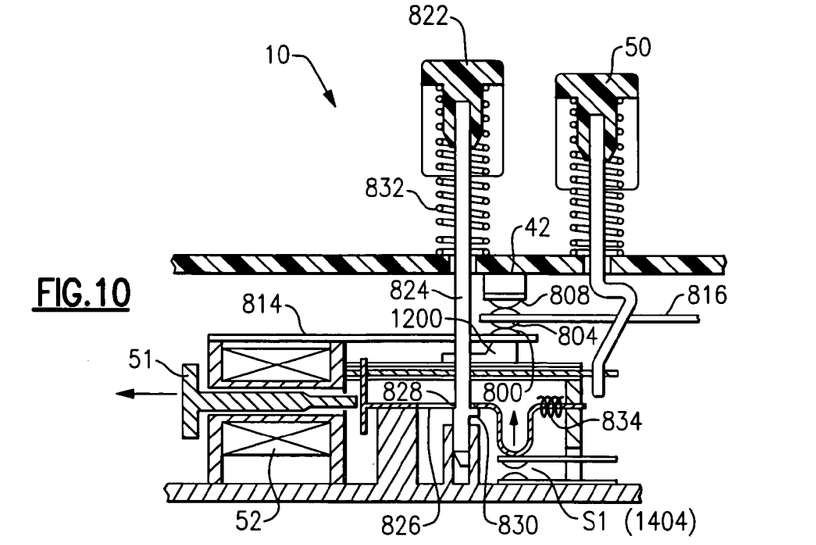
FIG. 10 is yet another detail view of a reset lock-out mechanism.

Referring to FIG. 8, reset is effected by applying a downward force to reset button 822. Shoulder 1400 on reset pin 824 bears downward on switch S1 as previously described. In FIG. 9, the wiring state detection circuit (See FIGS. 4–7) is properly powered and provides a signal that causes solenoid 52, 406 to activate armature 51. Armature 51 moves in the direction shown, permitting hole 828 in latch 826 to become aligned with shoulder 1400. The downward force applied to reset button 822 causes shoulder 1400 to continue to move downward, since it is no longer restrained by shoulder 1400. Referring to FIG. 10, since shoulder 1400 is disposed beneath latch 826, it is no longer able to apply a downward force on latch 826 to close electrical switch S1. Accordingly, switch S1 opens to thereby terminate the activation of solenoid 52, 406. Armature 51 moves in the direction shown in response to the biasing force of spring 834 and latch 826 is seated on latching escapement 830. As a result, device 10 is reset.

Figure 11:
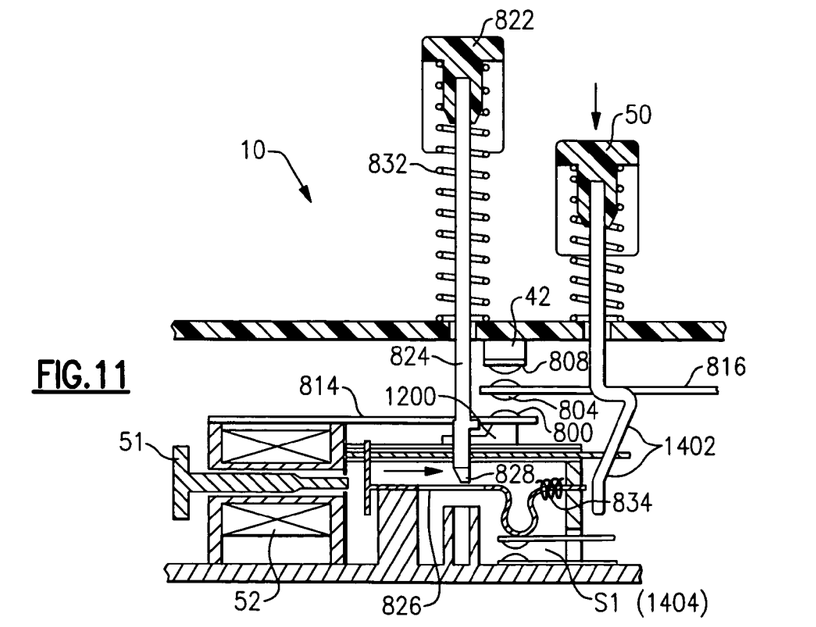
FIG. 11 is yet another detailed view of a reset lock-out mechanism.

Referring to FIG. 11, a user accessible test button 50 is coupled to the trip mechanism. When test button 50 is depressed, device 10 is tripped by a mechanical linkage 1402. In particular, mechanical linkage 1402 urges latch 826 in the direction shown when a force is applied to test button 50. Latch 826 counteracts the biasing force of spring 834 causing the hole 828 in latch 826 to become aligned with escapement 830. Contacts 800, 804, and 808 become separated, to trip device 10, because latch 826 is no longer restrained by escapement 830.

As previously described, device 10 is reset when solenoid 52, 406 is energized, causing armature 51 to unlock the reset lockout mechanism. However, if the protective device 10 is not properly wired, armature 51 cannot be activated. As a result, the mechanical barrier is not removed and the trip mechanism is prevented from resetting. The physical barrier prevents the protective device from being resettable if there is a miswire condition.

The four-pole circuit interrupter design with indicator may be implemented using a sandwiched cantilever mechanism. The indicator may be a visual and/or audible indicator. A visual indicator may be of various colors. The indicator may be steady or intermittent, e.g., a flashing red indicator. Reference is made to U.S. patent application Ser. No. 10/729,392 and U.S. patent application Ser. No. 10/729,396, which are incorporated herein by reference as though fully set forth in their entirety, for a more detailed explanation of a protective four pole device with a lockout and indicator.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electrical wiring protection device comprising:
    a housing assembly including at least one line terminal and at least one load terminal partially disposed therein;
    a first conductive path electrically coupled to the at least one line terminal;
    a second conductive path electrically coupled to the at least one load terminal, the second conductive path being connected to the first conductive path in a reset state;
    a fault detection circuit coupled to the first conductive path, the fault detection circuit being configured to generate a fault detection signal in response to detecting at least one fault condition;
    a wiring state detection circuit coupled to the first conductive path, the wiring state detection circuit selectively providing a wiring state detection signal when the at least one line terminal is coupled to a source of AC power;
    an actuator assembly configured to provide an actuator signal in response to the fault detection signal or the wiring state detection signal; and
    a circuit interrupter coupled to the actuator assembly, the circuit interrupter being configured to disconnect the first conductive path from the second conductive path in response to the actuator signal in the reset state.

2. The device of claim 1, further comprising:
a reset button; and
a switch coupled between the reset button and the wiring state detection circuit, the reset button being configured to close the switch to thereby generate the wiring state detection signal.

3. The device of claim 2, wherein the actuator assembly further comprises:
an electronic switch including a control input coupled to the switch; and
a solenoid coupled between the control input and the circuit interrupter.

4. The device of claim 3, wherein the coil includes an armature configured to open circuit the phase conductive path, the neutral conductive path, or both, when the solenoid is energized.

5. The device of claim 4, further comprising a lock-out mechanism coupled to the armature and the circuit interrupter, the lock-out mechanism preventing the reset button from effecting reset in the absence of the wiring state detection signal.

6. The device of claim 2, wherein the actuator assembly further comprises a solenoid coupled to the circuit interrupter, the wiring state detection circuit including the switch being disposed in series with the coil.

7. The device of claim 2, wherein the wiring state detection circuit includes a resistor disposed in series with the switch.

8. The device of claim 1, further comprising at least one user load terminal coupled to the first conductive path by way of a third conductive path, the third conductive path being connected to the first conductive path in a reset state, and the circuit interrupter being configured to disconnect the first conductive path and the third conductive path in response to the actuation stimulus.

9. An electrical wiring protection device comprising:
a housing assembly including at least one line terminal and at least one load terminal partially disposed therein;
a first conductive path electrically coupled to the at least one line terminal;
a second conductive path electrically coupled to the at least one load terminal, the second conductive path being connected to the first conductive path in a reset state;
a fault detection circuit coupled to the first conductive path, the fault detection circuit being configured to generate a fault detection signal in response to detecting at least one fault condition;
a reset button coupled to the at least one line terminal;
a wiring state detection circuit coupled to the reset button, the wiring state detection circuit selectively providing a wiring state detection signal when the reset button is actuated and the at least one line terminal is coupled to a source of AC power;
an actuator assembly configured to provide an actuation stimulus in response to the fault detection signal or the wiring state detection signal; and
a circuit interrupter coupled to the actuator assembly, the circuit interrupter being configured to disconnect the first conductive path and the second conductive path in response to the actuation stimulus in the reset state.

10. The device of claim 9, wherein the reset button includes switch contacts coupled to the wiring state detection circuit.

11. The device of claim 10, wherein the actuator assembly further comprises:
an electronic switch; and
a solenoid coupled to the circuit interrupter.

12. The device of claim 11, wherein the coil includes an armature configured to disconnect the first conductive path and the second conductive path when the solenoid is energized.

13. The device of claim 12, further comprising a lock-out mechanism coupled to the armature and the circuit interrupter, the lock-out mechanism preventing the reset button from effecting reset in the absence of the wiring state detection signal.

14. The device of claim 10, wherein the actuator assembly further comprises a coil coupled to the circuit interrupter, the wiring state detection circuit including the switch contacts being disposed in series with the coil.

15. The device of claim 9, further comprising at least one user load terminal coupled to the first conductive path by way of a third conductive path, the third conductive path being connected to the first conductive path in a reset state, and the circuit interrupter being configured to disconnect the first conductive path and the third conductive path in response to the actuation stimulus.

16. An electrical wiring protection device comprising:
a housing assembly including at least one line terminal and at least one load terminal partially disposed therein;
a first conductive path electrically coupled to the at least one line terminal;
a second conductive path electrically coupled to the at least one load terminal, the second conductive path being connected to the first conductive path in a reset state;
a fault detection circuit coupled to the first conductive path, the fault detection circuit being configured to generate a fault detection signal in response to detecting at least one fault condition;
a reset mechanism coupled to the at least one line terminal;
a wiring state detection circuit coupled to the reset mechanism, the wiring state detection circuit selectively providing a wiring state detection signal when the reset mechanism is actuated and the at least one line terminal is coupled to a source of AC power;
an actuator assembly configured to provide an actuation stimulus in response to the fault detection signal or the wiring state detection signal;
a circuit interrupter coupled to the actuator assembly, the circuit interrupter being configured to disconnect the first conductive path and the second conductive path in response to the actuation stimulus in the reset state; and
a reset lockout coupled to the circuit interrupter, the reset lockout preventing the circuit interrupter from reconnecting the first conductive path and the second conductive path in response to an actuation of the reset mechanism in the absence of the wiring state detection signal.

17. The device of claim 16, further comprising at least one user load terminal coupled to the first conductive path by way of a third conductive path, the third conductive path being connected to the first conductive path in a reset state, and the circuit interrupter being configured to disconnect the first conductive path and the third conductive path in response to the actuation stimulus.

18. The device of claim 17, wherein the reset mechanism includes a reset button coupled to a switch, an actuation of the reset button causing the switch to close.

19. The device of claim 18, wherein the wiring state detection circuit includes a resistor connected in series with the switch.

20. The device of claim 19, wherein the actuator assembly includes an electronic switch disposed in series with a solenoid.

21. The device of claim 18, wherein the wiring state detection circuit includes the switch, the switch being coupled to a control input of the actuator assembly.

22. The device of claim 21, wherein the actuator assembly includes an electronic switch disposed in series with a solenoid, the electronic switch including the control input.

23. A circuit interrupting device comprising:
a housing;
a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;
a circuit interrupting portion disposed within said housing and configured to cause electrical discontinuity in said phase and neutral conductive paths between said line side and said load side upon the occurrence of a predetermined condition; and
a reset portion disposed at least partially within said housing and configured to reestablish electrical continuity in said phase and neutral conductive paths;
said circuit interrupting device further comprising a reset lockout portion that prevents reestablishing electrical continuity in said phase and neutral conductive paths if a reverse wiring condition exists, wherein said reset portion comprises:
a reset button; and
at least one reset contact which when depressed is capable of contacting at least a portion of said phase conductive path to cause said circuit interrupting portion to operate if said device is properly wired, wherein if said circuit interrupting portion is operational, the circuit interrupting portion is activated to disable said reset lockout portion and facilitate reestablishing electrical continuity in said phase and neutral conductive paths, and wherein if said reverse wiring condition exists said circuit interrupting portion is non-operational, said reset lockout portion remains enabled so that reestablishing electrical continuity in said phase and neutral conductive paths is prevented.

24. A circuit interrupting device comprising:
a housing;
a first electrical conductive path disposed at least partially within said housing and terminating at a first connection, said first connection being capable of electrically connecting to a source of electricity;
a second electrical conductive path disposed at least partially within said housing and terminating at a second connection, said second connection being capable of electrically connecting to at least one load when electrical continuity between said first and second electrical conductive paths is made;
a third electrical conductive path disposed at least partially within said housing and terminating at a third connection, said third connection being capable of electrically connecting to at least one user accessible load when electrical continuity between said first and third electrical conductive paths is made;
a circuit interrupting portion disposed within said housing and configured to break electrical continuity between said first and second conductive paths and between said first and third conductive paths upon the occurrence of a predetermined condition; and
a reset portion disposed at least partially within said housing and configured to make electrical continuity between said first and second conductive paths and between said first and third conductive paths;
said circuit interrupting device further comprising a reset lockout portion that prevents the making of electrical continuity between said first and second conductive paths and between said first and third conductive paths, if said circuit interrupting portion is non-operational;
and wherein said reset portion comprises,
a reset button; and
at least one reset contact which when depressed is capable of contacting at least a portion of one of said first or second conductive paths to cause said circuit interrupting portion to operate if said device is properly wired, wherein if said circuit interrupting portion is operational, said circuit interrupting portion is activated to disable said reset lockout portion and facilitate making of electrical continuity between said first and second conductive paths and between said first and third conductive paths, and wherein if said device is reverse wired said circuit interrupting portion is non-operational, said reset lockout portion remains enabled so that making of electrical continuity between said first and second conductive paths and between said first and third conductive paths is prevented.

25. A circuit interrupting device comprising:
a housing;
at least one input conductor disposed at least partially within said housing and capable of being electrically connected to a source of electricity;
at least one output conductor disposed within said housing and capable of conducting electrical current to a load when electrically connected to said at least one input conductor;
a circuit interrupter disposed within said housing and configured to break said electrical connection between said input and output conductors in response to the occurrence of a predetermined condition;
a reset lock-out operable between a lock-out position wherein said reset lock-out inhibits resetting of said electrical connection between said input and output conductors, and a reset position wherein said reset lock-out does not inhibit resetting of said electrical connection between said input and output conductors; and
a reset mechanism operatively associated with said reset lock-out and said circuit interrupter such that activation of said reset mechanism activates said circuit interrupter if said device is properly wired to facilitate movement of said reset lock-out from said lock-out position to said reset position by said reset mechanism, said reset mechanism does not activate said circuit interrupter if said device is reverse wired such that said reset lock-out remains in said lock-out position.

26. A ground fault circuit interrupting device comprising:
a housing;
at least one input conductor disposed at least partially within said housing and capable of being electrically connected to a source of electricity;
at least one output conductor disposed within said housing an capable of conducting electrical current to a load when electrically connected to said at least one input conductor;
a circuit interrupter disposed within said housing and configured to break said electrical connection between said input and output conductors in response to the occurrence of a ground fault or test cycle; and
a reset mechanism having a reset lock-out responsive to activation of said circuit interrupter so as to be movable between a lock-out position wherein said reset lock-out inhibits resetting of said electrical connection between said input and output conductors and a reset position wherein said reset lock-out does not inhibit resetting of said electrical connection between said input and output conductors, wherein when actuation of said reset mechanism in a proper wiring condition activates said circuit interrupter to facilitate movement of said reset lock-out from said lock-out position to said reset position by said reset mechanism and resets said electrical connection between said input and output conductors, and wherein actuation of said reset mechanism in a reverse wiring condition does not activate said circuit interrupter to facilitate movement of said reset lock-out from said lock-out position to said reset position.

27. A method for interrupting and resetting electrical connections in fault interrupting devices having a housing, an input conductor disposed at least partially within the housing and electrically connected to a source of electricity, and an output conductor disposed at least partially within the housing and capable of conducting electrical current to a load when electrical continuity between the input and output conductors is made, said method comprising:
sensing the occurrence of a predefined condition;
breaking electrical continuity between the input and output conductors when said predefined condition is sensed using a circuit interrupting mechanism;
enabling a lock-out mechanism to inhibit the making of electrical continuity between the input and output conductors after breaking electrical continuity between said conductors; and
activating a reset mechanism to activate said circuit interrupting mechanism to disable said lock-out mechanism and make electrical continuity between said input and output conductors if said input connector is coupled to AC power, and wherein said circuit interrupting mechanism is not activated if said input connector is not coupled to AC power.

28. The method of claim 27, wherein said circuit interrupting mechanism is not activated if said output connector is coupled to AC power.

29. A circuit interrupting device, comprising:
a line side connection capable of being electrically connected to a source of electricity;
a load side connection capable of being electrically connected to a load side conductor for providing electricity to a load side;
a user load connection capable of conducting electricity to at least one load for providing an electrical connection to the source of electricity;
a first conductive path providing an electrical connection between the line side connection and the user load connection;
a second conductive path providing an electrical connection between the line side connection and the load side connection;
a reset mechanism;
a fault detection circuit configured to detect a fault condition;
a wiring state detector separate from the fault detection circuit, the wiring state detector being configured to test for a proper wiring condition when the reset mechanism is actuated; and
a circuit interrupter configured to interrupt the at least one of the first conductive path or the second conductive path when a proper wiring condition or a fault condition is detected.

30. The device of claim 29, wherein the wiring state detector generates a proper wiring condition signal if the line side connection is electrically connected to a source of electricity and does not generate a proper wiring condition signal otherwise.

31. An electrical wiring protection device comprising:
at least one line conductor;
at least one load conductor connected to the at least one line conductor in a reset state and disconnected from the at least one line conductor in a tripped state;
a first detection circuit coupled to the at least one line conductor, the first detection circuit being configured to propagate a first detection signal in response to a predetermined signal propagating on the at least one line conductor;
a second detection circuit coupled to the at least one line conductor, the second detection circuit configured to determine whether a source of AC power is coupled to the at least one line conductor or the at least one load conductor;
an actuator assembly coupled to the first detection circuit and the second detection circuit; and
a circuit interrupter coupled to the actuator assembly, the circuit interrupter being configured to trip in response to an actuator assembly input, the second detection circuit preventing the circuit interrupter from operating in the reset state when the source of AC power is coupled to the at least one load conductor.

32. The device of claim 31, wherein the actuator assembly includes at least one switching element.

33. The device of claim 31, wherein the actuator assembly includes a reset mechanism.

34. An electrical wiring protection device comprising:
at least one line conductor;
at least one load conductor connected to the at least one line conductor in a reset state and disconnected from the at least one line conductor in a tripped state;
a fault detection circuit coupled to the at least one line conductor, the fault detection circuit being configured to generate a fault detection signal in response to a predetermined signal propagating on the at least one line conductor;
an actuator coupled to the fault detection circuit and configured to generate a stimulus in response to the fault detection signal;
a circuit interrupter configured to be driven into the tripped state in response to the stimulus;
a reset mechanism configured to drive the circuit interrupter from the tripped state into the reset state; and a miswire detection circuit coupled to the at least one line conductor, the miswire detection circuit being configured to prevent device operation in the reset state when the at least one load conductor is coupled to AC power.

35. An electrical wiring protection device comprising:
at least one line conductor;
at least one load conductor connected to the at least one line conductor in a reset state and disconnected from the at least one line conductor in a tripped state;
a fault detection circuit coupled to the at least one line conductor, the fault detection circuit being configured to propagate a fault detection signal in response to a predetermined signal propagating on the at least one line conductor;
a circuit interrupter assembly coupled to the fault detection circuit and configured to trip in response to the fault detection signal; and
a second circuit coupled between the at least one line conductor and the circuit interrupter assembly, the second circuit precluding device reset when the at least one load conductor is coupled to AC power.

36. The device of claim 35, wherein the circuit interrupter assembly further comprises:
at least one switching element;
at least one solenoid element coupled to the at least one switching element; and
a circuit interrupter coupled to the at least one solenoid element.

37. The device of claim 36, further comprising a reset mechanism coupled to the circuit interrupter, the reset mechanism being configured to drive the circuit interrupter from the tripped state to the reset state.

38. The device of claim 36, wherein the second circuit is configured to provide the circuit interrupter assembly with a trip signal when the at least one load conductor is coupled to AC power.

39. The device of claim 38, wherein the trip signal is immediately provided to the circuit interrupter assembly when the reset mechanism is actuated.

* * * * *